A. R. YOUNG.
Fish-Guard for Water-Pipes.
No. 134,122.                      Patented Dec. 17, 1872.
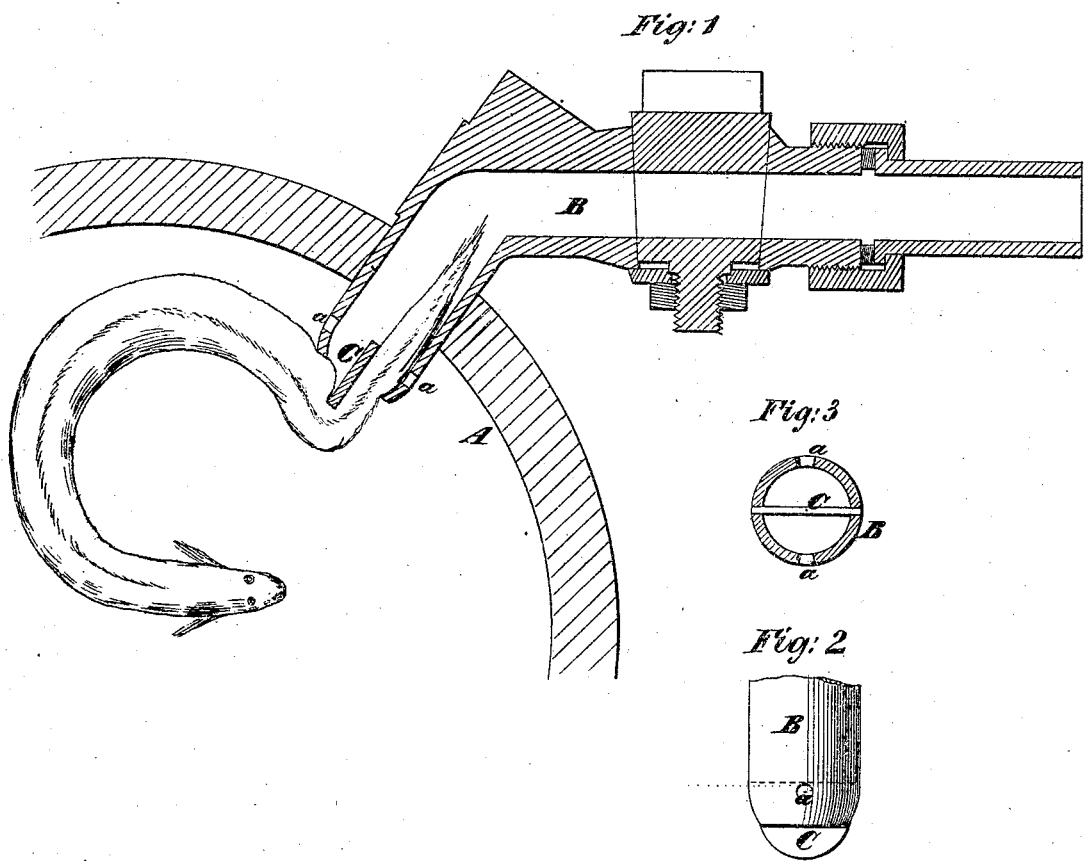

UNITED STATES PATENT OFFICE.

ALFRED R. YOUNG, OF BROOKLYN, NEW YORK.

IMPROVEMENT IN FISH-GUARDS FOR WATER-PIPES.

Specification forming part of Letters Patent No. 134,122, dated December 17, 1872.

*To all whom it may concern:*

Be it known that I, ALFRED R. YOUNG, of Brooklyn, in the county of Kings and State of New York, have invented a Fish-Guard for Water-Pipes and the like, of which the following is a specification:

Water-mains used to distribute the water in cities are commonly infested with eels and small fish. These are often drawn into the service-pipes of houses, and, by stopping them up, produce serious inconvenience.

The object of this invention is to obviate this difficulty; and to this end it consists in the combination of a projecting cross-bar or guard-piece arranged crosswise at the mouth of the pipe and adjacent holes or perforations, whereby even should a fish be drawn against the end of the pipe, the guard-piece will prevent it from being forced wholly into it, and the current will be through the holes, and thereby reduce the pressure at the mouth of the pipe sufficiently to allow the fish to free itself.

In the accompanying drawing, Figure 1 is a sectional view of a water-main and service-pipe connection having my improvement applied. Fig. 2 is a side view of the end of the service-pipe, and Fig. 3 is a transverse sectional view thereof.

Similar letters of reference indicate corresponding parts in the several figures.

A represents a street-main, and B the service-pipe connection for a house. Both these are of the usual form, except the mouth of the service-pipe connection. This has a plate or flat bar, C, arranged crosswise in it. This plate or bar, which I term a guard-piece, projects out from the end of the pipe some distance, so that even if a fish should be drawn or forced against it the guard-piece would prevent the fish from being drawn far into the pipe. Near the end of the pipe, opposite the middle of the guard-piece, are holes or perforations *a a*, which provide for the continuance of the flow of the water even when the end of the pipe is partially or wholly stopped up. By thus insuring the delivery the pressure on the fish is also reduced and its escape is facilitated.

Various contrivances have been devised for obviating the difficulty, but they have been ineffective. Wire-gauze has been inserted in the pipe, but this in time always chokes up with what *detritus* there may be in the water, and in this case "the remedy is as bad as the disease." The end of the pipe has been perforated, and, again, it has been furnished with small bars, but both these expedients have failed to meet the end for which they were intended.

I may perhaps in practice prefer to duplicate the number of bars or guard-pieces, and likewise increase the number of perforations, should I find that by doing so I facilitated the end in view.

Claim.

The combination of the projecting guard-piece or guard-pieces C C and the perforations *a a*, substantially as and for the purpose herein set forth.

ALFRED R. YOUNG.

Witnesses:
HENRY T. BROWN,
MICHAEL RYAN.